United States Patent [19]

Rosback et al.

[11] 4,048,111

[45] * Sept. 13, 1977

[54] METHOD FOR MANUFACTURING AN ADSORBENT USEFUL FOR OLEFIN SEPARATION

[75] Inventors: Donald H. Rosback, Elmhurst; Richard W. Neuzil, Downers Grove, both of Ill.

[73] Assignee: UOP Inc., Des Plaines, Ill.

[ * ] Notice: The portion of the term of this patent subsequent to Dec. 30, 1992, has been disclaimed.

[21] Appl. No.: 693,656

[22] Filed: June 7, 1976

Related U.S. Application Data

[63] Continuation-in-part of Ser. No. 586,446, June 12, 1975, abandoned, which is a continuation-in-part of Ser. No. 317,861, Dec. 12, 1972, Pat. No. 3,929,669.

[51] Int. Cl.[2] ............................................ B01J 29/06
[52] U.S. Cl. ............................................ 252/455 Z
[58] Field of Search ..................... 252/455 Z; 423/112

[56] References Cited

U.S. PATENT DOCUMENTS 3,929,669 12/1976 Rosback et al. ................. 252/455 Z

*Primary Examiner*—Carl F. Dees
*Attorney, Agent, or Firm*—James R. Hoatson, Jr.; Thomas K. McBride; William H. Page, II

[57] ABSTRACT

A method for the production of an adsorbent, having increased capacity for olefins and decreased catalytic activity for polymerization and isomerization, useful in the separation of olefins from a hydrocarbon mixture comprising olefins and paraffins. The methods basically comprises contacting a precursor mass comprising sodium X or sodium Y zeolite and amorphous material selected from the group consisting of silica, alumina and silica-alumina mixtures and compounds as a binder with an aqueous sodium hydroxide solution to increase the sodium cation content of the zeolite and to remove a small portion of silica and alumina; washing the zeolite with water to remove excess caustic solution; and, drying the zeolite to reduce the volatile content.

8 Claims, No Drawings

METHOD FOR MANUFACTURING AN ADSORBENT USEFUL FOR OLEFIN SEPARATION

CROSS-REFERENCE TO RELATED APPLICATIONS

This application is a continuation-in-part application of our prior, copending application Ser. No. 586,446 filed June 12, 1975 and now abandoned which was a continuation-in-part application of our application Ser. No. 317,861 filed on Dec. 12, 1972, now U.S. Pat. No. 3,929,669, Dec. 30, 1975, all the teachings of which are incorporated herein by specific reference thereto.

BACKGROUND OF THE INVENTION

1. Field of the Invention

The field of art to which this invention pertains is crystalline aluminosilicate production. More specifically this invention relates to a process for modifying the characteristics of a precursor mass comprising sodium X or sodium Y zeolite and amorphous material as a binder to produce an absorbent having characteristics desirable for use in a process for separating olefins from a hydrocarbon feed mixture containing olefins.

2. Description of the Prior Art

That the properties of zeolites can be modified by treating them with certain substances has generally been recognized by the prior art. For instances, U.S. Pat. No. 3,106,593 teaches the use of nitrogen-containing bases such as ammonia and various amines to neutralize surface acidity of certain zeolites used to separate olefins; U.S. Pat. No. 3,698,157 teaches that contacting ZSM-5 and ZSM-8 zeolites with organic-radical substituted silanes improves the selectivity of the zeolites for para-xylene with respect to the other xylenes when used in a xylene separation process; U.S. Pat. No. 3,855,333 teaches that contacting X or Y zeolites with certain alcohols improves the selectivity of the zeolite for the para-isomer with respect to other isomers when used in a para-isomer separation process. More specifically, the prior art has also recognized that treating certain zeolites with caustic solutions will modify particular zeolite properties and produce certain results depending on the type of zeolite and the treating conditions employed.

U.S. Pat. No. 3,326,797, for example, discloses treating high-silica zeolites, having silica to alumina mole ratios between about 6 and 12 (for example, mordenite) with caustic solutions for the purpose of removing a certain percentage of structural silica from the zeolites. The caustic treatment of such a high-silica zeolite, at conditions to preferably retain a final $SiO_2/Al_2O_3$ ratio greater than about 5.5, is found to increase the adsorptive capacity of the zeolite and to increase its catalytic activity particularly when used as a catalyst in such acid-catalyzed reactions such as cracking. The caustic treating of this patent is concerned with etching or leaching of silica from the particular zeolite structure to achieve these characteristics and does not disclose or suggest the addition of alkali metal cations to the zeolite structure during the treating process.

U.S. Pat. No. 3,717,572 discloses treating type A zeolites with nitrogen-free base solutions to modify "surface acidity" of the zeolite when used in a process for separating straight-chain olefins from branch-chain olefins. In contrast to the high-silica zeolites of U.S. Pat. No. 3,326,797, the type A zeolite is characterized by a rather low silica to alumina mole ratio, as taught in U.S. Pat. No. 2,882,243, within the range of 1.85±0.5. The treatment of such zeolites appears to be merely an acid-base reaction to neutralize surface acidity; the base appears not critical and can be generally bases whose cation is an alkaline metal, for instance, soda, potash, and lithium hydroxide. Treatment conditions are such that the concentration of the base solution after impregnation is about the same as the fresh base solution. The result desired and that produced with the particular zeolite is only neutralization of acidity; indeed, the preferred solvent for the base solution is an organic medium (in particular methanol) since in such cases neutralization is obtained while maintaining a practically unchanged adsorptive capacity of the sieve. Neutralization by aqueous base solutions actually lowers this capacity.

Thus the prior art has recognized that similar base treatments of different zeolites can produce different results. Such is not surprising since the zeolites vary considerably in such chemical and physical properties as composition, silica to alumina mole ratio, symmetry, cell dimensions, structure, density, pore diameter, and surface area.

The method of our invention is concerned with the treatment of a precursor mass comprising sodium X or sodium Y zeolite and amorphous material as a binder with an aqueous caustic solution. We have found that the treatment of such precursor mass at particular treatment conditions will produce an absorbent having increased capacity for olefins and decreased catalytic activity when used in a process for separating olefins from paraffins. The absorbent produced is more efficient for olefin separation because of its increased capacity and has longer effective life because of its reduced catalytic activity.

SUMMARY OF THE INVENTION

It is, accordingly, a broad objective of our invention to provide a method for the manufacture of an adsorbent comprising sodium X or sodium Y zeolites having both increased capacity for olefins and decreased catalytic activity. It is another object of our invention to provide a process for separating olefins from a feed mixture comprising olefins and saturates which process employs the absorbent produced by the method of the invention.

In brief summary, our invention is, in one embodiment, a method for the production of improved absorbent particles having increased capacity for olefins and decreased catalytic activity from a precursor mass comprising sodium Y zeolite having a $Na_2O/Al_2O_3$ ratio less than about 0.7 and amorphous material selected from the group consisting of silica, alumina and silica-alumina mixtures and compounds which method comprises the steps of: (a) contacting said precursor mass with an aqueous sodium hydroxide solution at ion exchange conditions to increase the sodium cation content to a $Na_2O/Al_2O_3$ ratio of greater than about 0.7 and to remove from about 1 to about 15 wt. % silica and alumina from the precursor mass; (b) washing said mass with water to remove therefrom excess sodium hydroxide; and, (c) at least partially dehydrating said mass at dehydrating conditions.

In another embodiment our invention is the adsorbent produced by the method and in yet another embodiment, our invention is an olefin separation process which comprises the steps of: contacting a hydrocarbon feed mixture which comprises olefins and saturates with an adsorbent produced by the method of this invention at adsorption conditions to effect the selective retention of olefins by the absorbent; withdrawing from the bed of absorbent a raffinate stream comprising less selectively retained hydrocarbons; contacting the absorbent bed with a desorbent material at desorption conditions to effect desorption of the olefins from the adsorbent; and, withdrawing from the absorbent a stream comprising olefins and desorbent.

DESCRIPTION OF THE INVENTION

Since the anticipated use for the adsorbent prepared by the method of this invention is in various processes for the separation of olefinic hydrocarbons from a feed mixture containing olefinic and saturated hydrocarbons. The particular usefulness of this adsorbent and general insight into its desirable characteristics may be better understood by brief reference to those processes.

In separating the olefinic hydrocarbons from the feed mixture, the feed is contacted with a bed or beds of the adsorbent comprising type X or type Y zeolites and olefinic hydrocarbons are selectively retained by the adsorbent while the unadsorbed or raffinate hydrocarbons comprising saturated hydrocarbons are removed from the interstitial void spaces between the particles of adsorbent and the surface of the solid adsorbent. The adsorbent is then contacted with a desorbent material which is capable of displacing the adsorbed olefinic hydrocarbons from the adsorbent.

The adsorbent can be contained in a single chamber where through programmed flow into and out of the chamber, separation of the olefinic hydrocarbons is effected. Processes, employing swing-bed operational techniques, where a series of adsorbent chambers are available, or more preferably employing the simulated moving-bed countercurrent operations generally disclosed in U.S. Pat. No. 2,985,589, can use the adsorbent prepared by the method of this invention.

A particularly preferred process to use the adsorbent of this invention is the continuous process for the separation of olefins from a hydrocarbon feed mixture comprising olefins and saturates described in our assignee's U.S. Pat. No. 3,510,423 which patent is incorporated herein by reference thereto. That process basically comprises the steps of: contacting the feed mixture with a particular adsorbent at adsorption conditions to effect the selective retention of the olefins by the adsorbent, withdrawing from the bed of adsorbent a raffinate stream comprising less selectively retained hydrocarbons, contacting the adsorbent with a desorbent material at desorption conditions to effect desorption of the olefins from the adsorbent, and withdrawing a stream containing olefins and desorbent from the adsorbent. The longer useful life of our adsorbent would be an improvement to such processes as this one in which a regeneration step is not included in the normal sequence of operations.

Preferred operating conditions of that particular process as well as our improved process include a temperature within the range of from about 25° C. to about 150° C. and a pressure within the range of from about atmospheric to about 500 psig. Furthermore, both adsorption and desorption of the olefins are preferably effected at conditions selected to maintain liquid phase throughout the bed of adsorbent.

The adsorbent produced by the method of this invention may of course be used in other selective adsorption processes for separating olefins. These might include, for instance, swing-bed processes in which both adsorption and desorption are conducted in the vapor phase or in which one operation is conducted in the vapor phase and the other in the liquid phase. Operating pressures and temperatures for adsorption and desorption might be the same or different.

Charge stocks which may be used in the above or other selective adsorption separation processes may contain olefins in the $C_4$–$C_{20}$ carbon range. Of these olefins, those in the $C_{10}$–$C_{15}$ range are particularly preferred. The $C_{10}$–$C_{15}$ normal mono-olefins are generally produced by catalytically dehydrogenating a $C_{10}$–$C_{15}$ normal paraffin stream. The effluent stream from a dehydrogenation process generally contains about 5 to 25% olefins and may require further processing in order to concentrate the normal olefinic hydrocarbons.

A typical example of the composition of the effluent stream from a dehydrogenation process is shown below in Table 1:

TABLE 1

DEHYDROGENATION REACTOR EFFLUENT ANALYSIS BY GAS-LIQUID CHROMATOGRAPHY

| | | Wt. % |
|---|---|---|
| n-$C_{10}$ paraffin | | 0.1 |
| n-$C_{11}$ paraffin | | 24.9 |
| n-$C_{11}$ olefin | | 1.8 |
| n-$C_{12}$ paraffin | | 27.8 |
| n-$C_{12}$ olefin | | 2.6 |
| n-$C_{13}$ paraffin | | 22.6 |
| n-$C_{13}$ olefin | | 2.7 |
| n-$C_{14}$ paraffin | | 12.1 |
| n-$C_{14}$ olefin | | 1.7 |
| n-$C_{15}$ paraffin | | 0.4 |
| Total non-normals | | 3.3 |
| | TOTAL | 100.0 |
| Total normal paraffins | | 87.9 |
| Total normal olefins | | 8.8 |
| Total non-normals | | 3.3 |
| | TOTAL | 100.0 |
| | | Vol. % |
| Total olefins | | 9.8 |
| Light ends | | 0.2 |
| Total paraffins | | 86.5 |
| Total non-normals | | 3.5 |
| | TOTAL | 100.0 |

The 3.5 volume percent non-normals in the above analysis are primarily aromatics. Another possible charge stock for the process would be a selected fraction from a gasoline produced by a fluid catalytic cracking unit. A typical analysis, from a 95° C. cut of such gasoline is as follows:

| | Vol. % |
|---|---|
| Olefins | 25.4 |
| Paraffins and naphthenes | 72.3 |
| Aromatics | 2.3 |
| | 100.0 |

The desorbents which can be used in processes employing this adsorbent will vary depending on the type of operation employed. In the swing bed system in which the adsorbed olefins are removed from the adsorbent by a purge stream, gaseous hydrocarbons or other type gases may be used at elevated temperatures or reduced pressures or both to effectively purge adsorbed olefins from within the adsorbent. However, in other type operations which are generally operated at substantially constant pressures and temperatures, the desorbent relied upon must be judiciously selected in order that it may displace the preferred olefin adsorbed from the feed within the adsorbent without unduly preventing the feed olefins from displacing the desorbent in a following adsorption cycle. In processes where liquid-phase substantially isothermal and isobaric operations are employed, it is preferred to use an olefinic aromatic desorbent. The desorbent may be either a normal mono-olefin or a branched chain mono-olefin.

With the type of processes employing adsorbents to separate olefins now in mind, one can appreciate that certain characteristics of adsorbents are highly desirable, if not absolutely necessary, to the successful operation of the selective adsorptive process. Among such characteristics are: adsorptive capacity for some volume of desired olefins per volume of adsorbent; reduced or eliminated catalytic activity for undesired side reactions such as polymerization and isomerization; and selectivity of adsorption both for the feed olefins and the desorbent material with respect to the undesired feed components.

Capacity of the adsorbent for adsorbing a specific volume of olefins is of course a necessity; without such capacity the adsorbent is useless for adsorptive separation. Furthermore, the higher the adsorbent's capacity for the species to be adsorbed, the better is the adsorbent. Increased capacity of a particular adsorbent makes it possible to reduce the amount of adsorbent needed to separate the desired species contained in a particular rate of hydrocarbon feed mixture. A reduction in the amount of asdorbent required for a specific adsorptive separation reduces the cost of the separation process. It is important that the good initial capacity of the adsorbent be maintained during actual use in the separation process over some economically desirable life. For this reason, and others, it is necessary that the adsorbent possess little or no catalytic activity which would produce products that might degrade adsorbent capacity or selectivity.

It is additionally important that the highly reactive olefins are not reacted into side products which either degrade the product quality or reduce the overall yield of concentrated olefins. Where the feed stream to the process includes both normal and isomeric olefin hydrocarbons, the isomerization activity of the adsorbent is not of as much significance as the polymerization activity of the adsorbent. The polymerization of feed olefins by the adsorbent reduces the yield of olefinic hydrocarbon product and also degrades the adsorbent. The polymer produced destroys the effectiveness of the adsorbent by plugging up the surface of the adsorbent and the pores present in the structure of the adsorbent. This shortens the useful life of the adsorbent and make necessary frequency regeneration treatments to restore the adsorptive properties of the adsorbent. In instances where one or more particular olefin isomers are desired to be separated and recovered in high purity from a feed stream which contains the isomers and saturates the isomerization activity of the adsorbent becomes an equal if not greater problem than the polymerization activity. If the adsorbent possesses isomerization activity the product may be contaminated with undesired isomeric olefins produced from the feed olefins by the adsorbent.

Since both reactions seem to occur at the same time, the term "catalytic activity" as used herein shall mean both isomerization and polymerization activity. While reducing the temperature of the operations of the adsorption process in which the catalytic activity is present will substantially reduce the catalytic activity because of the associated reduction in the rate of reaction, this procedure in adsorptive separation processes employing molecular seives, in most cases, is not desirable because the reduction in temperature also reduces the kinetic energy of the material passing into and out of the adsorbent. This substantially reduces the rate of exchange of feed olefins into and out of the adsorbent giving what is considered in the art as poor breakthrough fronts which results in product contamination with feed stock and relatively high requirements of adsorbent for a given throughput of olefin-containing feed stock. It is, therefore, extremely important that the catalytic activity be substantially reduced or preferably totally eliminated by proper methods of manufacture of a selected adsorbent.

The other important characteristic is the ability of the adsorbent to separate components of the feed; or, in other words, the relative selectivity, (B), of the adsorbent for one component as compared to another component. Relative selectivity is expressed not only for the desired hydrocarbon type (olefins) as compared to undesired hydrocarbons but is also expressed between homologs of the desired hydrocarbon type. The relative selectivity (B) as used throughout this specification is defined as the ratio of the two components of the adsorbed phase over the ratio of the same two components in the unadsorbed phase at equilibrium conditions.

Relative selectivity is shown as Equation 1 below:

Equation 1

$$\text{Selectivity} = (B) = \frac{[\text{vol. percent } C/\text{vol. percent } D]_A}{[\text{vol. percent } C/\text{vol. percent } D]_U}$$

were C and D are two components of the feed represented in volume percent and the subscripts A and U represent the adsorbed and unadsorbed phases respectively. The equilibrium conditions were determined when the feed passing over a bed of adsorbent did not change composition after contacting the bed of adsorbent. In other words, there was no net transfer of material occurring between the unadsorbed adsorbed phase.

Where the selectivity of two components approaches 1.0 there is no preferential adsorption of one component by the adsorbent with respect to the other; they are both adsorbed (or non-adsorbed) to about the same degree. As the (B) becomes less than or greater than 1.0 there is a preferential selectivity by the adsorbent of one component with respect to the other. When comparing the selectivity by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1 with respect to the feed olefins.

The adsorbent produced by the method of this invention has good capacity and selectivity for olefins and little or no catalytic activity thereby making it particularly effective for use in a process for the separation of olefins.

In order to test various adsorbents to measure the characteristics of adsorptive capcity, selectivity, and degree of catalytic activity, a dynamic testing apparatus was employed. The apparatus used consisted of an adsorbent chamber of approximately 40 cc. volume having inlet and outlet portions at opposite ends of the chamber. The chamber was contained within a temperature control means and, in addition, pressure control equipment was used to operate the chamber at a constant predetermined pressure. Attached to the outlet line of the chamber was chromotographic analysis equipment which was used to analyze the effluent stream leaving the adsorbent chamber.

The actual operations used to determine the adsorbent capacity were as follows. A feed mixture containing at least one adsorbable component in a dilute component was passed through the adsorbent bed until the effluent stream leaving the adsorbent chamber, as measured by the chromatograph, was essentially the same compositions as the feed stream passing into the inlet of the adsorbent chamber. Generally, the adsorbable component used in the feed mixture is decene-1. This indicates that the seive has reached equilibrium, that is, the adsorbent was no longer adsorbing materials from the external phase and that there was no longer a net transfer of the material between the adsorbed phase and the external phase.

A desorbent mixture, containing an adsorbable component different from that of the feed, in a diluent component, was then passed into the adsorbent chamber at conditions to effect desorption of the previously adsorbed feed mixture component. Octene-1 is usually used as the adsorbable component in the desorbent mixture. The desorbent mixture was continuously passed into the adsorbent chamber will until the effluent material, as monitored by the chromatographic equipment was substantially identical to the desorbent feed material, indicating that equilibrium conditions had been achieved. Knowing the flow rate to the chamber and the effluent composition as continuously monitored by the chromatograph, the total amount of the components adsorbed by the adsorbent from the desorbent mixture can be calculated.

In order to determine the adsorptive capacity of the sieve for components in the feed mixture, the inlet stream to the chamber was then switched from the desorbent mixture back to the feed mixture to allow feed components to displace the previously adsorbed components from the desorbent mixtures. Again using the chromoatograph and knowing the flow rate and effluent composition, the volume of feed components adsorbed can be calculated.

Selectivity can then be calculated using the previously mentioned equation for selectivity and the capacities determined above.

In measuring the polymerization activity of a particular adsorbent, the same gas chromatographic equipment and testing apparatus was used. Two variations of the polymerization test can be used. In the first variation, the degree of catalytic activity may be measured by the loss of a known concentration of feed olefin as detected in the effluent stream by the chromatographic equipment. The measure of polymerization is then an indirect determination, being related to the difference between the inlet and outlet olefin concentrations. This catalytic activity is thought to be primarily due to polymerization reactions of the feed olefins with a small part of the feed olefins that are isomerized to other internal olefinic isomers. The relative activity scale used to express the catalytic activity of the adsorbent is determined by measuring the peak height on the chromatograph equivalent to the inlet concentration of olefin as indicative of a zero catalytic activity. Hence, if the peak height of the olefins present in the effluent is same as the peak height of a known concentration of olefins present in the feed the relative adsorbent activity is zero. An effluent peak height equal to one half that of the feed would represent exactly 50% polymerization or isomerization of the feed olefin component. The adsorbent activity would therefore be 50%. Equation 2 below represents the formula used to determine catalytic activity of an adsorbent knowing the peak height of the olefins remaining in the effluent stream leaving the adsorbent chamber and the peak height of the olefins present in the feed.

Equation 2

$$\text{Adsorbent Activity} = 100 - 100\frac{(Pe)}{(Pf)}$$

where Pe represents the peak height of the effluent olefins and Pf represents the peak height of the feed olefins.

The second variation of the catalytic activity test is to measure directly the polymer formed in the effluent stream with the chromatographic equipment. This variation depends upon selecting a feed olefin, such as diisobutylene, that easily forms an identifiable polymer. The dimer peak height above the base line is then used as the measure of polymerization and catalytic activity is reported as dimer units. The first variation is particularly useful to initially determine the catalytic activity of various adsorbents while the second variation is particularly useful in more accurately determining catalytic activity of adsorbents shown by the first test variation to have low catalytic activity.

Adsorbents produced by the method of this invention will comprise specific crystalline aluminosilicates or molecular sieves. Particular crystalline aluminosilicates encompassed by the present invention include crystalline aluminosilicate cage structures in which the alumina and silica tetradhedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves. Separations with molecular sieves are commonly thought to occur because of differences in the sizes of molecules. While this may be true of some separations, such as the separation of normal paraffins from isoparaffins, the adsorptive separation of olefins from saturates takes place because of differences in electrochemical forces between olefins and saturates and the adsorbent rather than by pure physical size differences between the feed molecules.

In hydrated form, the crystalline aluminosilicates generally encompass those zeolites represented by the Formula 1 below:

FORMULA 1

$$M_{2/n}O:Al_2O_3:wSiO_2:yH_2O$$

where "M" is a cation which balances the electrovalence of the tetrahedra and is generally referred to as an exchangeable cationic site, *n* represents the valence of the cation, *w* represents the moles of $SiO_2$, and *y* represents the moles of water. The generalized cation M may be monovalent, divalent, trivalent or mixtures thereof.

The prior art has generally recognized that adsorbents comprising the X and Y zeolites can be used in certain adsorptive separation processes. These zeolites are described and defined in U.S. Pat. Nos. 2,882,244 and 3,120,007, respectively, which are incorporated herein by reference thereto.

The X zeolite in the hydrated or partially hydrated form can be represented in terms of mole oxides as shown in Formula 2 below:

FORMULA 2

$$(0.9\pm0.2)M_{2/n}O:Al_2O_3:(2.5\pm0.5)SiO_2:yH_2O$$

where M represents at least one cation having a valence of not more than 3, *n* represents the valence of M, and *y* is a value up to about 9 depending upon the identity of M and the degree of hydration of the crystal. As noted from Formula 2 the $SiO_2/Al_2O_3$ mole ratio for the type X zeolite is $2.5\pm0.5$. The cation M may be one or more of a number of cations such as the hydrogen cation, an alkali metal cation, or an alkaline earth cation, or other selected cations, and is generally referred to as an exchangeable cationic site. As the X zeolite is initially prepared, the cation M is usually predominantly sodium and the zoelite is therefore referred to as a sodium-X zeolite. Depending upon the purity of the reactants used to make the zeolite, other cations mentioned above may be present, however, as impurities.

The Y zeolite in the hydrated or partially hydrated form can be similarly represented in terms of mole oxides as in formula 3 below:

FORMULA 3

$$(0.9\pm0.2)M_{2/n}O:Al_2O_3:wSiO_2:yH_2O$$

where M is at least one cation having a valence not more than 3, *n* represents the valence of M, *w* is a value greater than about 3 up to 8, and *y* is a value up to about 9 depending upon the identity of M, and the degree of hydration of the crystal. The $SiO_2/Al_2O_3$ mole ratio for type Y zeolites can thus be from about 3 to about 8. Like the X zeolite, the cation M may be one or more of a variety of cations but, as the Y zeolite is initially prepared, the cation M is usually predominantly sodium with the other cations present usually as impurities. A Y zeolite containing predominantly sodium cations at the exchangeable cationic sites is therefore referred to as a sodium-Y zeolite.

The starting material which is used in the method of this invention for manufacturing an adsorbent is referred to in this specification as a precursor mass and comprises a X or Y zeolite and a portion of amorphous material. The zeolite will typically be present in the precursor mass in amounts ranging from about 75 wt.% to about 98 wt.% of the precursor mass based on volatile free compositions. Volatile free compositions are generally determined after the precursor mass has been calcined at 900° C. in order to drive off all volatile matter. The remainder of the precursor mass will generally be amorphous material such as silica, alumina or silica-alumina mixtures or compounds, such as clays, which material is present in intimate mixture with the small particles of the zeolite material. This amorphous material may be an adjunct of the manufacturing process for X or Y zeolite (for example, intentionally incomplete purification of either zeolite during its manufacture) or it may be added to relatively pure X or Y zeolite but in either case its usual purpose is as a binder to aid in forming or agglomerating the hard crystalline particles of the zeolite. Normally the precursor mass, whether in the form of extrudates, aggregates, pellets or macrospheres, is first granulated to a particle size range of about 16–40 mesh (Standard U.S. Mesh) before the caustic treatment step is begun. This is approximately the desired particle size of the finished adsorbent. Examples of suitable starting materials which can be used in the method of our invention are "Molecular Sieves 13X" and "SK-40" both of which are available from the Linde Company, Tonawanda, New York. The first material of course contains X zeolite while the latter material contains Y zeolite.

The caustic treatment step is primarily an ion exchange step in which sodium cations replace non-sodium cation impurities in the zeolite-containing precursor mass thereby reducing or eliminating the catalytic activity of the zeolite. Although mild ion exchange conditions are employed, this step additionally removes a small amount of silica or silica and alumina thereby increasing the capacity of the material for olefins. Total silica and alumina removal from the precursor mass is from about 1 to about 15% and is generally in the range of 5 to 15%. The percentage silica and alumina removal may be calculated using $SiO_2$ and $Al_2O_3$ analyses of the liquid effluent from the treatment step or by using $SiO_2$ and $Al_2O_3$ analyses of the precursor mass and the finished adsorbent. Further evidence of this removal is the increase in the percent zeolite, (as determined by X-ray analysis) and surface area and also the slight reduction in the $SiO_2/Al_2O_3$ ratio of the starting material. The silica or silica and alumina removed is thought to be primarily from the amorphous binder present in the precursor mass, whether silica or alumina or silica-alumina mixtures and compounds, and not from the zeolite itself. This belief is based upon the fact that the difference between the $SiO_2/Al_2O_3$ ratio determined by chemical analysis (which determines $SiO_2$ and $Al_2O_3$ present in both crystalline and amorphous form) and the same ratio determined by X-ray analysis (which determines $SiO_2$ and $Al_2O_3$ present in a crystalline structure only) is smaller for the precursor mass after the NaOH treatment method than it is for the untreated precursor mass indicating loss of $SiO_2$ or $SiO_2$ and $Al_2O_3$ from the amorphous binder rather than from the zeolite structure.

We have found not only that this ion exchange step significantly reduces catalytic activity but specifically that the amount of activity reaction is proportional to the amount of sodium cation contained by the finished adsorbent. This relationship, with the amount of sodium expressed as the ratio $Na_2O/Al_2O_3$, is indicated in Table 2 below. Catalytic activities for a particular precursor mass consisting of Linde 13X Molecular Sieves and for various adsorbents prepared from this precursor mass were determined using the more sensitive of the activity tests previously described.

Table 2

Relationship Between $Na_2O/Al_2O_3$ and Catalytic Activity

| Adsorbent | $Na_2O/Al_2O_3$ | Catalytic Activity (Dimer Units) |
|---|---|---|
| precursor mass | .61 | 55 |
| A | .78 | 4.5 |
| B | .81 | 3.75 |
| C | .83 | 2.35 |
| D | .85 | 2.05 |
| E | .88 | 1.10 |

Table 2-continued

| Relationship Between $Na_2O/Al_2O_3$ and Catalytic Activity | | |
|---|---|---|
| Adsorbent | $Na_2O/Al_2O_3$ | Catalytic Activity (Dimer Units) |
| F | .91 | 0 |

As shown in the table, catalytic activity decreases with increasing sodium ion content from an unacceptable 55 dimer units of the precursor mass to about zero as the $Na_2O/Al_2O_3$ ratio approaches 1. For an acceptable adsorbent it is preferred that the $Na_2O/Al_2O_3$ ratio of the final product be greater than about 0.70.

Ion exchange conditions should be so regulated to achieve this desired degree of ion exchange. The degree of ion exchange achieved is a function of the three variables of caustic concentration, temperature at which the ion exchange is conducted, and the length of time the ion exchange is continued. The ion exchange solutions employed herein are preferably water solutions of sodium hydroxide. Suitable concentrations to obtain the desired ion exchange can be from about 0.5 to 10% by weight of sodium hydroxide with the preferred concentration being from about 0.5 to 5% by weight. By using solutions of these concentrations, the desired ion exchange can be obtained at temperatures from about 50° to 300° F. with temperature from about 150° to 250° F. being preferred. Operating pressure is not critical and need only be sufficient to insure a liquid phase. Operating pressure can range from about atmospheric pressure to about 100 psig. The length of time required for the ion exchange will vary depending upon the solution concentration and temperature from about 0.5 to 5 hours. At the above preferred concentration and temperatures, a contact time which has been shown to be specially preferred is about 2 to 3 hours. The ion exchange step should be controlled so that the final product will have a $Na_2O/Al_2O_3$ ratio greater than about 0.7. Periodic sampling and analyses can be employed if desired to closely monitor the progress of this step.

The next step in the method of this invention is the washing step for the purpose of removing excess sodium hydroxide solution remaining within the ion-exchanged adsorbent mass. The washing medium is water which has a pH within the range of 7 to 10 and preferably within the range of 9 to 10. If necessary the water is adjusted to and maintained at the desired pH by adding a small amount of sodium hydroxide solution. Since the primary purpose of the ion exchange was to remove hydrogen cation (and metal cation) contaminates, this pH range is necessary to avoid redepositing hydrogen cation on the adsorbent mass. Washing temperatures can include temperatures within the range of about 100° F. to about 200° F. with a temperature of 135° F. to 145° F. preferred. Although the washing step can be done in a batch manner with one aliquot of wash water at a time, the washing step is generally and preferably done on a continuous flow type basis with water passed through a bed of the adsorbent at a given liquid hourly space velocity and a temperature for a period of time in order that from about 1 to about 5 gallons of water per pound to starting material is used to wash the material. Preferred washing conditions include using liquid hourly space velocities from about 0.5 to about 5, with 1.5 being preferred, to pass from about 1 to about 3 gallons of wash water per pound of starting material over the ion exchanged adsorbent. A good indication of complete washing is made by measuring the pH of the effluent wash water and comparing it to the pH of the fresh feed wash water. When they are the same washing can generally be considered as complete.

When the wash step is completed the wet adsorbent particles will usually contain from about 30 to about 50 wt. % volatile matter (water) as measured by loss on ignition (L.O.I.) at 900° C. The remaining step in the method of manufacture then is the drying step in which the volatile content of the washed adsorbent is reduced to less than about 10 wt. % L.O.I. at 900° C. with the preferred volatile content being about 5 to 7 wt. % L.O.I. at 900° C. Drying conditions includethe presence of air and can include temperature from about 100° F. to about 1000° F. The time required to achieve the desired volatile content will vary depending upon the drying temperature and the exact volatile content of the water-washed adsorbent particles to be dried.

The following example is presented to demonstrate the method of this invention and the improved properties of an adsorbent prepared by the method of this invention and is not intended to unduly limit the scope of the appended claims.

EXAMPLE

An adsorbent, comprising sodium X zeolite having improved capacity for olefins and acceptably low catalytic activity, was produced using the following procedure.

A precursor mass consisting of Linde 13X Molecular Sieves (X zeolite and amorphous binder) in the form of nominal 1/16-inch extrudate commercially available from Union Carbide Linde Division, was ground to produce 16–40 U.S. Standard mesh particle size material having physical and chemical properties as shown in Table No. 3 shown below. Olefin capacity and catalytic activity were obtained using the testing apparatus and procedures previously described.

Table 3

| Properties of the Precursor Mass | |
|---|---|
| Chemical Properties | |
| Volatile Matter (loss on ignition at 900° C.), wt. % | 3.2 |
| $SiO_2$ (volatile free) wt. % | 50.7 |
| $Al_2O_3$ (volatile free) wt. % | 33.6 |
| $Na_2O$ (volatile free) wt. % | 12.4 |
| $Na_2O/Al_2O_3$ | .61 |
| $SiO_2/Al_2O_3$ | 2.56 |
| Physical Properties | |
| Apparent Bulk Density, gm/cc | 0.635 |
| Surface Area, $M^2$/gm | 500 |
| Pore Volume, ml/gm | 0.30 |
| Pore Diameter, A | 24 |
| Area % faujasite (X-ray) | 93 |
| $SiO_2/Al_2O_3$ (X-ray) | 2.5 |
| Particle size distribution: | |
| Wt. % on 16 U.S. Screen | 0.3 |
| on 20 | 33.3 |
| on 30 | 37.9 |
| on 40 | 21.4 |
| on 56 | 6.1 |
| on 60 | 0.3 |
| through 60 U.S. Screen | 0.7 |
| Testing Data | |
| $A_8$, cc of octene-1/40cc adsorbent | 3.1 |
| $A_{10}$, cc of decene-1/40cc adsorbent | 2.8 |
| Catalytic Activity, Dimer Units | 55 |

One hundred pounds of the granular precursor mass was loaded into an ion exchange tower against an upward flow of 1.6 wt. % NaOH solution at a rate such that the effluent temperature did not exceed 145° F. After all of the material was loaded, the material was ion exchanged by passing the 1.6 wt. % NaOH solution upflow through the ion exchange tower at a liquid hourly space velocity (LHSV) of 1.5 and a temperature of 200° F. until a total of 0.335 pounds of NaOH per pound of volatile-free precursor mass had been passed through the tower.

After the ion exchange step the ion exchanged material was water washed by passing treated water, having a pH of 10, upflow through the tower at 1.5 LHSV and 140° F. to a total of 1.3 gallons of water per pound of volatile free starting material.

The washed material was then dewatered, unloaded from the ion exchange tower, and dried in a forced air oven at 570° F. to a volatile content of 5.0 wt. % LOI at 900° C. An overall yield of 72% dried 16–40 U.S. mesh granular adsorbent was obtained by this procedure. Properties of the finished adsorbent are shown in Table No. 4 below:

Table 4

| Properties of the Finished Adsorbent | |
|---|---|
| Chemical Properties | |
| Volatile Matter | |
| (loss on ignition at 900° C.) wt. % | 5.0 |
| $SiO_2$ (volatile free) wt. % | 48.0 |
| $Al_2O_3$ (volatile free) wt. % | 32.1 |
| $Na_2O$ (volatile free) wt. % | 15.8 |
| $Na_2O/Al_2O_3$ | 0.81 |
| $SiO_2/Al_2O_3$ | 2.54 |
| Physical Properties | |
| Apparent Bulk Density, gm/cc | 0.671 |
| Surface area, $M^2$/gm | 516 |
| Pore volume, ml/gm | 0.27 |
| Pore diameter, A | 21 |
| Area % faujasite (X-ray) | 110 |
| $SiO_2/Al_2O_3$ (X-ray) | 2.5 |
| Particle Size Distribution | |
| Wt. % on 16 U.S. Screen | 0.0 |
| on 20 | 22.7 |
| on 30 | 37.1 |
| on 40 | 29.0 |
| on 56 | 8.2 |
| on 60 | 0.1 |
| through 60 U.S. Screen | 2.9 |
| Testing Data | |
| Olefin Capacity: | |
| $A_8$, cc of octene-1/40cc adsorbent | 3.78 |
| $A_{10}$, cc of decene-1/40cc adsorbent | 3.35 |
| Catalytic Activity, Dimer Units | 3.9 |

Testing results shown in Tables 3 and 4 show that by the method of this invention the adsorbent total capacity for olefins has been increased about 15% and as importantly the catalytic activity has been substantially decreased from 55 dimer units to an acceptable activity of 3.9 dimer units. The $Na_2O$ content of the adsorbent has been increased about 25% from 12.4 wt. % $Na_2O$ ($Na_2O/Al_2O_3$ of 0.61) for the precursor mass to 15.8 wt. % $Na_2O$ ($Na_2O/Al_2O_3$ of 0.81) for the finished adsorbent, the $SiO_2$ content has been decreased about 5.3% from 50.7 wt. % $SiO_2$ for the precursor mass to 48.0 wt. % $SiO_2$ for the finished adsorbent and the alumina content has been decreased about 4.5% from 33.6 wt. % $Al_2O_3$ to 32.1 wt. % $Al_2O_3$ for the finished adsorbent.

We claim as our invention:

1. A method for the production of improved adsorbent particles having increased capacity for olefins and decreased catalytic activity from a precursor mass comprising sodium Y zeolite having a $Na_2O/Al_2O_3$ ratio less than about 0.7 and amorphous material selected from the group consisting of silica, alumina and slica-alumina mixtures and silica-alumina compounds which method comprises the steps of:

a. contacting said precursor mass with an aqueous sodium hydroxide solution at ion exchange conditions to increase the sodium cation content to a $Na_2O/Al_2O_3$ ratio of greater than about 0.7 and to remove from about 1 to about 15 wt. % silica and alumina from the precursor mass;

b. washing said mass with water to remove therefrom excess sodium hydroxide; and, c. at least partially dehydrating said mass at dehydrating conditions.

2. The method of claim 1 further characterized in that said ion exchange conditions include a temperature within the range of from about 50° F. to about 300° F. and a sodium hydroxide solution concentration of from about 0.05 to about 10 wt. % NaOH.

3. The method of claim 2 further characterized in that said ion exchange conditions include a temperature within the range of the from about 150° F. to about 250° F. and a sodium hydroxide solution concentration of from about 0.5 to 5 wt. %.

4. The method of claim 1 further characterized in that said dehydration conditions include a temperature within the range of from about 100° F. to about 1000° F.

5. The method of claim 1 further characterized in that the wash water in step (b) is maintained at a pH within the range of 7 to 10.

6. An improved adsorbent having increased capacity for olefins and decreased catalytic activity produced by the steps of:

a. contacting a precursor mass comprising sodium Y zeolite having a $Na_2O/Al_2O_3$ ratio less than about 0.7 and amorphous material selected from the group consisting of silica and alumina and silica-alumina mixtures and compounds with an aqueous sodium hydroxide solution at ion exchange conditions to increase the sodium cation content to a $Na_2O/Al_2O_3$ greater than about 0.7 and to remove from about 1 to about 15 wt. % of silica and alumina from the precursor mass;

b. washing said mass with water to remove therefrom excess sodium hydroxide; and, c. at least partially dehydrating said mass at dehydrating conditions.

7. The adsorbent of claim 6 further characterized in that the volatile content of said adsorbent is less than about 10 wt. % LOI at 900° C.

8. The adsorbent of claim 6 further characterized in that it is in a particle size range of about 16 to about 40 U.S. Standard mesh.

* * * * *